July 3, 1956  C. L. CALOSI  2,753,500
ELECTRONIC POSITION AND MOTION CONTROL SYSTEMS
Filed Dec. 9, 1953  3 Sheets-Sheet 1

INVENTOR
CARLO L. CALOSI
BY Elmer J. Gorn
ATTORNEY

July 3, 1956    C. L. CALOSI    2,753,500
ELECTRONIC POSITION AND MOTION CONTROL SYSTEMS
Filed Dec. 9, 1953    3 Sheets-Sheet 3

INVENTOR
CARLO L. CALOSI
BY Elmer J. Gorn
ATTORNEY

United States Patent Office 2,753,500
Patented July 3, 1956

2,753,500

ELECTRONIC POSITION AND MOTION CONTROL SYSTEMS

Carlo L. Calosi, Rome, Italy, assignor to Raytheon Manufacturing Company, Waltham, Mass., a corporation of Delaware Application December 9, 1953, Serial No. 405,225

15 Claims. (Cl. 318—162)

This invention relates to electronic systems for supervising and controlling the position and motion of a movable element, and more particularly to an accurate and precise control based upon and utilizing as the control forces a pair of voltages representing vectorial components of a stressing force set up by the element to be controlled.

Patent No. 2,627,055, granted January 27, 1953, discloses a vector voltage responsive system and illustrates the mode of operation of such a system as applied to the task of duplicating with a machine tool the contour of a template conforming to the specifications to be incorporated into a piece of material subjected to treatment by such machine tool.

The present invention constitutes an extension of the principles inherent in the invention of the patent above identified, and at the same time provides distinguishing methods and means for utilizing a pair of vector voltages to control the operation of a pair of stylus-positioning motors functioning concurrently to impart to the template-engaging stylus (and/or to the cutting tool) a movement which is a vectorial resultant of the two complementary driving forces applied by the respective motors.

More specifically, the present invention substitutes for the two separate vector analyzing and summarizing procedures of the above-identified patent a vector-merging procedure permitting consolidation into a single electrical vector of all the information (including error correction information) necessary to insure accurate reproduction of the originating, or master, motion. Thus, whereas the method described in the patent is to feed commands to the two operating motors by two distinct, non-merging vector summation procedures, the present invention by contrast involves the concept of single-locus vector consolidation, that is, the concept of consolidating the two vectors representing the two components of the master motion, so that the possible deflection errors of each are algebraically added and corrected as a single operation, thereby assuring maximum accuracy in the transmitted command prior to its final resolution into its two operating components, for application to the complementary motors. In the illustrated embodiment the two complementary motors function to impart a resultant motion to the template-engaged stylus to cause it to move tangentially of the template surface.

As part of the vector consolidating process above referred to, the illustrated embodiment of the invention involves a single modulating step in contrast to the two distinct modulating actions of the cited patent. This single modulating action is attained by provision of a single set of modulating tubes, with interconnected control grids, and a common output circuit including the primary of a single transformer unit, the transformer secondary being directly applied to the consolidated vector summation unit in which both the orthogonally-related voltage vectors appear in combined form so that both said vectors are deviation-compensated simultaneously and by a single direct modulating action rather than by two distinct operations as in the prior embodiment. The specific manner in which this all-embracing deviation compensation operates (in the illustrated embodiment) is as follows.

Whenever, because of changing template contour, the stylus deflection departs momentarily from the predesignated operating deflection, an output from the common modulator results. This output combined both the magnitude and directional aspects of the stylus deviation, with the magnitude of the deviation being reflected as amplitude modulation, and the direction of the deviation being reflected as phase modulation. The resultant modulator output is applied directly to the second of two vector summation units, where it is added in quadrature to the signal which said second summation unit is simultaneously receiving directly from the first summation unit. This modulator increment (or decrement, as the case may be) causes a corresponding phase rotation of the second vector summation output. This phase rotation correspondingly varies the two subsequently resolved component voltages, the variation in commands to the respective stylus operating motors ("Mx" and "My") being just enough, in magnitude and direction, to cause said motors to bring about an elimination of stylus deviation, that is, a restoration of the stylus to true tangential tracing at the prescribed deflection rate, whereupon the output of the common control modulator returns to zero.

The preceding paragraph makes passing incidental reference to that step in the operation whereby the consolidated command signal is finally resolved into its two component voltage vectors, for dual operation of the motors Mx and My, respectively. The method of effecting this final resolution of voltage constitutes another feature of the invention, and includes the step of applying phase discrimination to the sinusoidal signal output of the second vector summation unit above described, the application of phase discrimination being illustrated as taking the form of interposing two full-wave synchronous demodulators in the sinusoidal signal circuit, and causing said demodulators to be driven in quadrature to the saturation condition, thereby producing two distinct D. C. voltages, one of which corresponds to the sine of the consolidated vector phase angle and the other to the cosine thereof. These two distinct D. C. voltages become the operating commands for the motors Mx and My, respectively.

Other features and characteristics of the invention will be revealed by reference to the following detailed description of the embodiment illustrated in the drawings wherein:

Fig. 3 shows the details of the saturation phase discriminator, or demodulator, above referred to; and Fig. 4 is a graph showing the relationship of the consolidated sinusoidal signal to the two component D. C. voltages derived therefrom by operation of the discriminator of Fig. 3.

Figure 1:
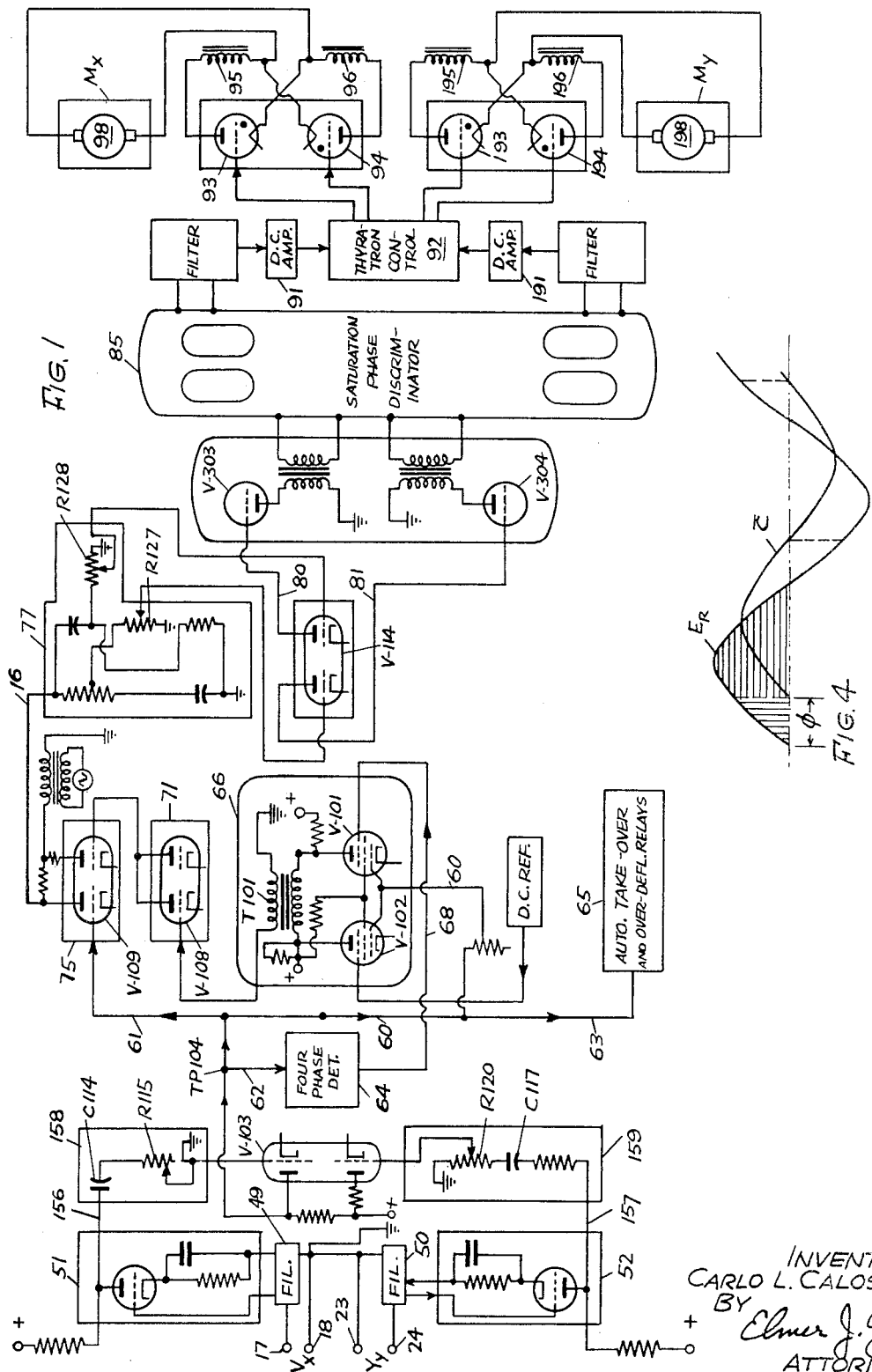
Fig. 1 is a schematic diagram of a system constituting an embodiment of the invention, certain electrical components and circuit connections being omitted for greater clarity.
Figure 2:
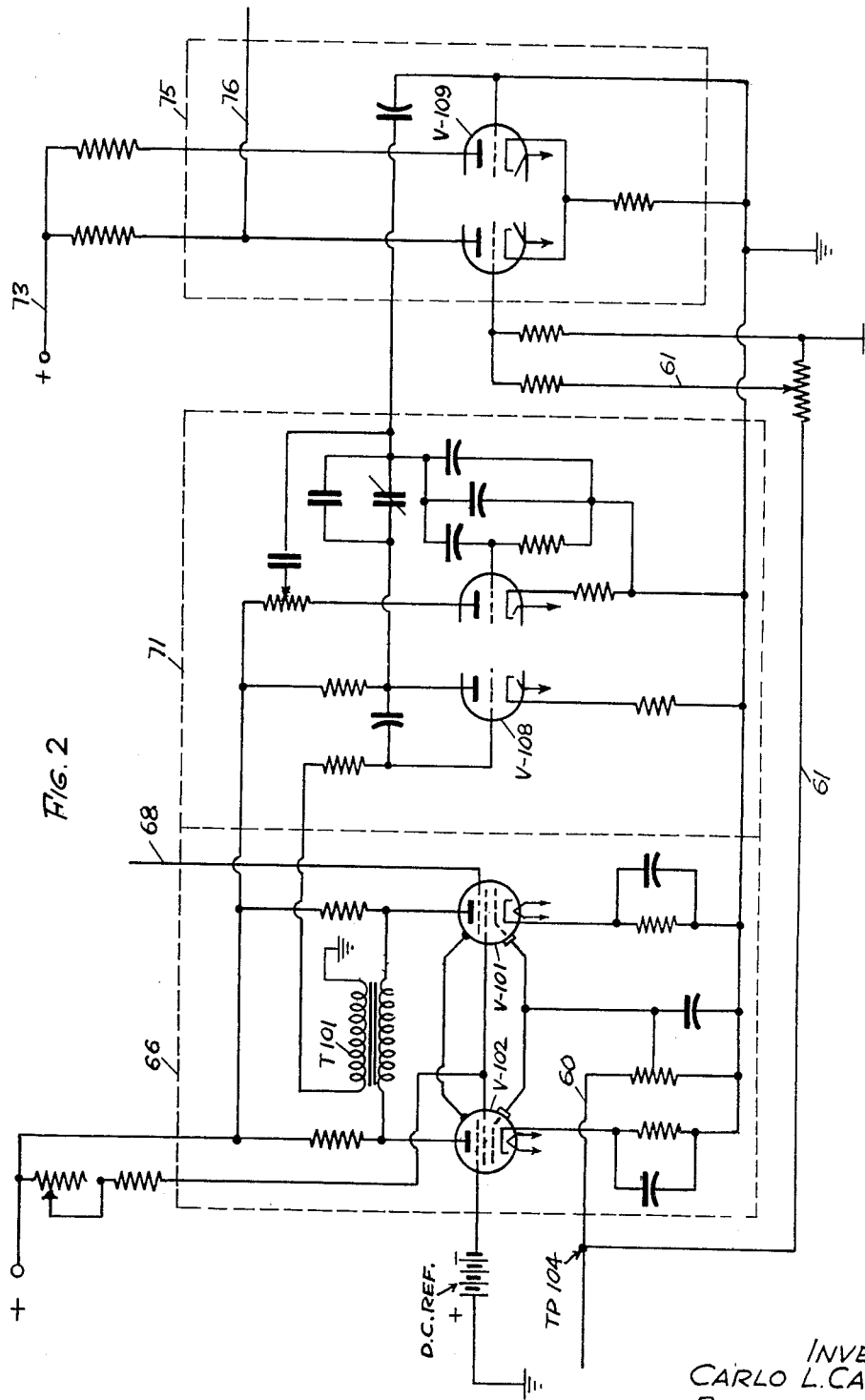
Fig. 2 shows the details of the single modulator and adjacent parts for exercising control of both components of the operating command signal.

Referring to Fig. 1, the signal receiving terminals 17, 18, 23, and 24 are to be understood as corresponding to those similarly designated in Patent No. 2,627,055, and are adapted to receive operating voltage Vx and Vy, proportional to the orthogonally-related abscissal and ordinal components, respectively, of the original duplicating force. As explained more fully in said patent, the said voltages may be those which are generated in quadrantally-spaced field coils of an alternating voltage generator whose armature is mechanically connected to a stylus having contact with a template whose contour is to be duplicated. Voltages V$x$ and V$y$ are alternating voltages of the same phase but represent physical forces that are ninety degrees divergent.

The voltage V$x$ is applied to an amplifier 51 and the voltage V$y$ to an amplifier 52. These units 51 and 52 are shown as corresponding to the similarly designated units of the cited patent, and may, as a matter of optional preference, be preceded by filter networks 49 and 50, respectively, involving inductance-capacitance configurations having a particular effectiveness in the system here disclosed in that they tend to eliminate, by attenuation, transient frequency components induced by momentary shock excitations such as those set up by mechanical vibration or sudden extreme contour changes. These filter networks, which are in no respect essential to the operativeness of, or to an understanding of, the present invention, are disclosed more fully, and claimed, per se, in United States application No. 396,238, filed December 4, 1953, in the name of A. J. Carr, Jr., said application being assigned to the assignee of the subject invention.

The output circuits 156 and 157 of amplifiers 51 and 52 are routed through phase shifting networks 158 and 159, including potentiometers R115 and R120, and capacitors C114 and C117. A pair of electron triodes in a common envelope V103 have their control grids connected to the movable taps of potentiometers R115 and R120, respectively, the tube V103 constituting part of the first of the two stages of voltage vector summation. By reason of these connections the grids of tube V103 receive voltages that are respectively ninety electrical degrees out of phase, and convert these two voltage vectors into a resultant voltage proportional in magnitude to the vector sum. This resultant voltage is delivered to junction point TP104 (Fig. 1) from which point it follows along four diverging conductors 60, 61, 62, and 63. Conductor 60 leads to the modulator unit 66. Conductor 61 leads to the left-hand control grid of a twin triode V109 constituting part of the second of the two stages of voltage vector summation; conductor 62 leads to a deviation detection assembly 64 which may correspond to the detection assembly 81 of the cited Patent No. 2,627,055, said assembly 81 constituting means for introducing into the voltage output of the first summation stage the incremental A. C. voltage signals, in quadrature, which represent the deviations of the stylus from the deflection pattern pre-assigned thereto, as well as "anti-hunt" means which likewise may correspond to that disclosed at 81 in the cited Patent No. 2,627,055, containing a more detailed description of stylus deviations from the deflection pattern, their origin, and their detection. Conductor 63 leads to a unit 65 which operates to suspend the normal functioning of the system, and to substitute alternative controls, when the stylus deflects to an excessive degree, that is, to a degree beyond that readily compensable by action of the single modulator unit 66, to be described more fully hereinafter.

The unit 65 is an optional part of the system, but if employed it will preferably take the form disclosed in detail in United States application No. 396,237, filed December 4, 1953, in the name of A. J. Carr, Jr., and assigned to the assignee of the subject invention.

The unit 64, as above noted, may include the "anti-hunt" unit 81 of the cited Patent No. 2,627,055, or it may take the four-phase detection and "anti-hunt" form disclosed in detail in United States patent application No. 397,227, filed December 9, 1953, in the name of Jules Sandock, and assigned to the assignee of the subject invention. In either case the output thereof is delivered to a conductor 68 leading to the upper control grid of a dual control tube V101 constituting one-half of the inter- connected tube pair V101, V102 of the single modulator unit 66 which coacts with circuit rotator unit 71 and the second stage vector summation unit V109 in establishing voltage command signal consolidation at the unit V109, to produce the single-locus vector consolidation hereinabove referred to as a primary characteristic of the invention.

The plate circuits of tubes V101 and V102 are connected to opposite terminals of the primary winding of transformer T101 whose secondary leads to the left-hand control grid of twin triode V108 forming a part of the "Miller circuit" ninety-degree rotator 71, leading to the right-hand control grid of twin triode V109, where it joins with the output of the tube V108 and the output of the first summation stage V103 (delivered to tube V109 by way of lead 61) to achieve the single-locus vector consolidation hereinabove referred to.

The output of vector consolidation unit 75 is supplied to line 76 leading to the phase-controlled signal dividing unit 77 consisting of R–C combinations including potentiometers R127 and R128 whose movable taps are connected electrically to the respective grids of twin triode amplifier V114. The plate circuits 80 and 81 of amplifier V114 excite the grids of amplifier tubes V303 and V304, respectively, in quadrature, and these tubes supply their respective motor command signal outputs to the saturation phase discriminator 85, by way of transformers 83 and 84, respectively.

Figure 3:
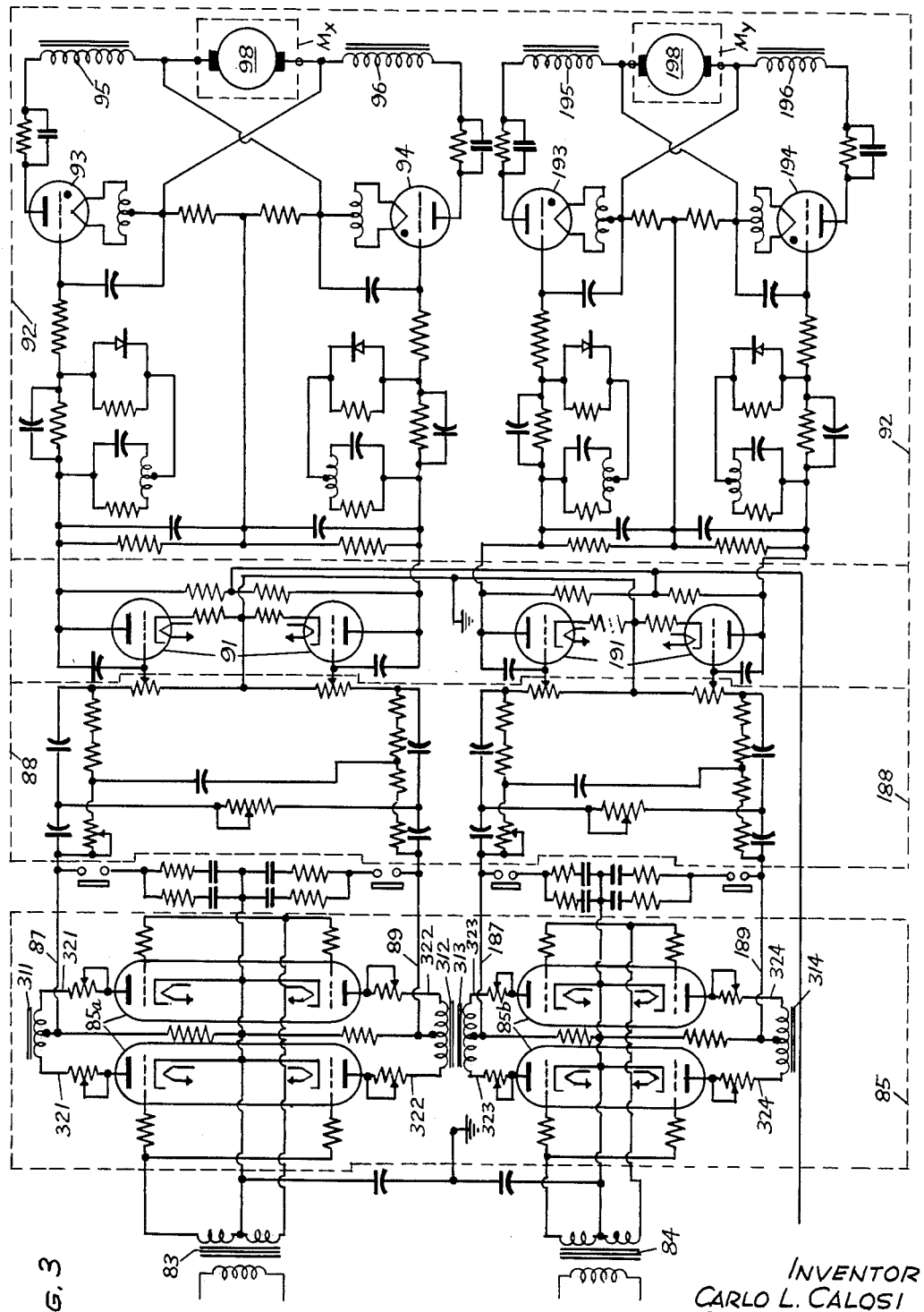

As shown best in Fig. 3, the phase discriminator, or demodulator 85, consists of two demodulating networks, each of which includes a pair of twin triodes whose control grids are excited by connecting them to the terminals of the secondary of transformers 83 and 84, respectively. The plate circuits of the triodes include transformers 311 to 314 whose primary windings are supplied with reference vector voltage, the windings of transformers 311 and 312 receiving reference voltage E$_R$ by way of leads 321 and 322, and the windings of transformers 313 and 314 receiving phase rotated reference voltage E$_R$ by way of leads 323 and 324. The tube cathodes are connected to the center taps of the respective transformers.

Fig. 4 shows graphically a cycle of operation for one value of the phase angle $\phi$, that is, the angle between the sinusoidal consolidated voltage output C of the vector consolidator 75, on the one hand, and the reference voltage E$_R$ on the other. The saturation of the four triode circuits in quadrantal sequence results from the fact that the grid signal is so large that the current in the affected triode becomes sinusoidal to follow the plate supply reference voltage E$_R$, so that for every stage of each cycle one of the four triodes is conducting, the conducting triode for each successive quarter-cycle being the one whose grid and plate are simultaneously of positive potential. The difference in the area of the two cross-hatched spaces in Fig. 4 represents the average D. C. output voltage delivered by the discriminator to D. C. output feeds 87 and 89 (Fig. 3). This output can be seen to be proportional to the cosine of the phase angle $\phi$. On the other hand, since the reference voltage input to the lower discriminator is phase rotated ninety degrees from that of the upper discriminator, the D. C. output voltage delivered to leads 187 and 189 will be proportional to the sine of the phase angle $\phi$. Thus out of the two demodulators 85$a$ and 85$b$ are derived two D. C. voltages, one proportional to cosine $\phi$ and one proportional to sine $\phi$. Because of this complementary character of the two motor-controlling command voltages, the combined velocity of the motor drives M$x$ and M$y$ will always remain constant in magnitude. The direction of this combined velocity is, of course, determined by the phase angle $\phi$, and, since the angle $\phi$ has its derivation in the vector consolidation unit 75 and therefore is a reflection of all of the deviation compensating signals, it follows that the result of the combined action of the motors M$x$ and M$y$ will be to maintain the stylus in contact with the template's surface along a course that is tangential to said surface.

Since the two motor command voltages delivered to lines 87, 89, 187 and 189 are D. C. voltages, as above determined, it becomes possible to employ thyratron tubes as the control agencies for the two motors Mx and My, and to excite the grids of these tubes with these varying D. C. voltages as amplified in D. C. amplifiers 91 and 191. The motor armature power supply may be A. C. current supplied by the transformer secondary windings 95, 96, 195 and 196, and rectified by the action of the thyratrons, so that only the D. C. component is utilized. The voltage dividing and rectifying circuits indicated in block form at 92 function to control the application of the necessary biasing voltage to the grids of the thyratrons 93, 94, 193 and 194 and hence govern the speed and direction of rotation of the armatures 98, 198, respectively, of motors Mx and My, in accordance with the strength of the output voltages in lines 87, 89, 187 and 189.

Prior to reaching the grids of the thyratrons, the D. C. voltages in lines 87, 89, 187 and 189 are passed through filter networks 88 and 188, respectively, which networks reject 120 cps. components of the ripple voltage increment which may accompany the basic D. C. signal voltage.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, first and second input circuits adapted to receive first and second input voltages, respectively, means for deriving from said voltages a single resultant voltage proportional to a stressing force vectorially represented by said two input voltages, means for modifying said single resultant voltage to compensate for physically applied deviations in said stressing force, and means for resolving said modified single resultant voltage into two component voltages having a vectorial relationship conforming to the vectorial components of said stressing force.

2. The system defined in claim 1, wherein said modifying means comprises a single modulating circuit responsive to the combined input voltages, and a single signal consolidating circuit receiving the output of said single modulating circuit.

3. The method of controlling the position and motion of a work supervising element which includes the steps of generating two voltages representing angularly related components of the normal stressing force applied to said element, deriving from said two voltages a single resultant voltage proportional to the vectorial sum of said two voltages, modifying said single resultant voltage to compensate for deviations set up by departures of said stressing force from the normal, and resolving said modified single resultant voltage into two component voltages having a vectorial relationship conforming to the vectorial components of said stressing force.

4. The method defined in claim 3, wherein the resolution of said modified single resultant voltage includes the steps of establishing two phase differentiated component voltages by phase rotation of said single resultant voltage, and phase discriminating said two component voltages to obtain two direct current voltage outputs for conjoint application to said work supervising element.

5. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course.

6. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage.

7. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage, and means for converting the D. C. voltage outputs of the respective phase discriminators into force directing effort applied in angularly related directions whose vectorial summation determines the direction of application of said physically applied force.

8. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage, and means for converting the D. C. voltage outputs of the respective phase discriminators into force directing effort applied in angularly related directions whose vectorial summation determines the direction of application of said physically applied force, said converting means including a plurality of dynamo-electric machines, and means actuated by said D. C. voltage outputs to control operation of said dynamo-electric machines.

9. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage, and means for converting the D. C. voltage outputs of the respective phase discriminators into force directing effort applied in angularly related directions whose vectorial summation determines the direction of application of said physically applied force, said converting means including a plurality of dynamo-electric machines, and means actuated by said D. C. voltage outputs to control operation of said dynamo-electric machines, said last-named means comprising gaseous electronic discharge devices controlling the respective speeds of rotation of said dynamo-electric machines in accordance with the relative magnitudes of said D. C. voltage outputs.

10. In duplicating equipment, apparatus for maintaining a stylus in tangential contact with a template comprising, in combination, first and second follower circuits adapted to receive first and second input voltages, respectively, means for deriving from said input voltages a single resultant voltage proportional to the stressing force set up in said stylus, means for modifying said single resultant voltage to compensate for physically applied deviations in said stressing force, and means for resolving said modified single resultant voltage into two component voltages having a vectorial relationship conforming to the vectorial components of said stressing force.

11. In duplicating equipment, apparatus for maintaining a stylus in tangential contact with a template comprising, in combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course.

12. In duplicating equipment, apparatus for maintaining a stylus in tangential contact with a template comprising, in combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage.

13. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage, and means for converting the D. C. voltage outputs of the respective phase discriminators into force directing effort applied in angularly related directions whose vectorial summation determines the direction of application of said physically applied force.

14. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage, and means for converting the D. C. voltage outputs of the respective phase discriminators into force directing effort applied in angularly related directions whose vectorial summation determines the direction of application of said physically applied force, said converting means including a plurality of dynamo-electric machines, and means actuated by said D. C. voltage outputs to control operation of said dynamo-electric machines.

15. In combination, plural input circuits adapted to receive plural vector voltages, respectively, vector summation means for deriving from said vector voltages a consolidated voltage representative of a physically applied force, means for modulating said consolidated voltage in accordance with deviations in the physically applied force, and means for resolving said modulated consolidated voltage into plural component voltages whose relative magnitudes are such as to direct said physically applied force along a prescribed course, said resolving means comprising plural saturation phase discriminators for demodulating phase differentiated components of said modulated consolidated voltage, and means for converting the D. C. voltage outputs of the respective phase discriminators into force directing effort applied in angularly related directions whose vectorial summation determines the direction of application of said physically applied force, said converting means including a plurality of dynamo-electric machines, and means actuated by said D. C. voltage outputs to control operation of said dynamo-electric machines, said last-named means comprising gaseous electronic discharge devices controlling the respective speeds of rotation of said dynamo-electric machines in accordance with the relative magnitudes of said D. C. voltage outputs.

References Cited in the file of this patent

UNITED STATES PATENTS

| | | |
|---|---|---|
| 2,356,186 | Somers | Aug. 22, 1944 |
| 2,537,770 | Livingston et al. | Jan. 9, 1951 |
| 2,627,055 | Calosi | Jan. 27, 1953 |